United States Patent [19]

Avittan

[11] Patent Number: 4,793,092
[45] Date of Patent: Dec. 27, 1988

[54] FLY TRAP

[76] Inventor: Naftali Avittan, 431 Malden, Richardson, Tex. 75080

[21] Appl. No.: 98,685

[22] Filed: Sep. 21, 1987

[51] Int. Cl.$^4$ ............................................. A01M 1/10
[52] U.S. Cl. ........................................ 43/122; 43/107
[58] Field of Search ......................... 43/107, 114, 122

[56] References Cited

U.S. PATENT DOCUMENTS

| | | | |
|---|---|---|---|
| 1,606,568 | 11/1926 | Gross | 43/107 |
| 3,581,429 | 6/1971 | Hickman | 43/107 |
| 3,820,273 | 6/1974 | Novak | 43/122 |
| 4,133,137 | 1/1979 | van Adelsberg | 43/114 |
| 4,316,344 | 2/1982 | Carlsen | 43/114 |
| 4,592,163 | 6/1986 | Wilson | 43/122 |

Primary Examiner—M. Jordan
Attorney, Agent, or Firm—Howard R. Greenberg

[57] ABSTRACT

A fly trap comprises a funnel housed in a container which guides flies from a portal in the container to the container interior wherein they are unable to wend their way back out.

1 Claim, 1 Drawing Sheet

FLY TRAP

BACKGROUND OF THE INVENTION

The present invention pertains to fly traps.

Various and some exotic means have been developed for dealing with flies and the discomfort they inflict on mortal beings. For example, an early and crude means was a sticky hanging tape to which flies would be attracted and become stuck. Although effective, it was equally unsightly. A more modern means is the equivalent of the electric chair which attracts flies into an electric field and then destroys them by electricity. Also effective, but expensive and noisy.

With the foregoing in mind, it is a primary object of the present invention to provide a new and improved fly trap for disposing of flies.

It is a further object of the present invention to provide such a fly trap which is inexpensive and unobtrusive.

BRIEF DESCRIPTION OF THE INVENTION

An extended closed container, such as a box, houses a funnel, such as a pyramidal frustum, which extends between the lower and upper extremities of the container. A space separates the smaller aperture of the top of the funnel and the upper extremity of the container and an enclosed pathway connects the larger aperture of the base of the funnel to a portal in the lower extremity of the container. Flies which have the misfortune to enter the portal tend to fly up through the funnel into the container wherein they eventually expire because of an inability to find their way back down the funnel. A sweet scented source can be placed in the container to attract the flies. The container and the funnel therein can easily be fabricated from some inexpensive material such as cardboard and tossed away together with the terminated flies after extended usage.

DETAILED DESCRIPTION OF THE PREFERRED EMBODIMENT

Figures 1, 2, 3:
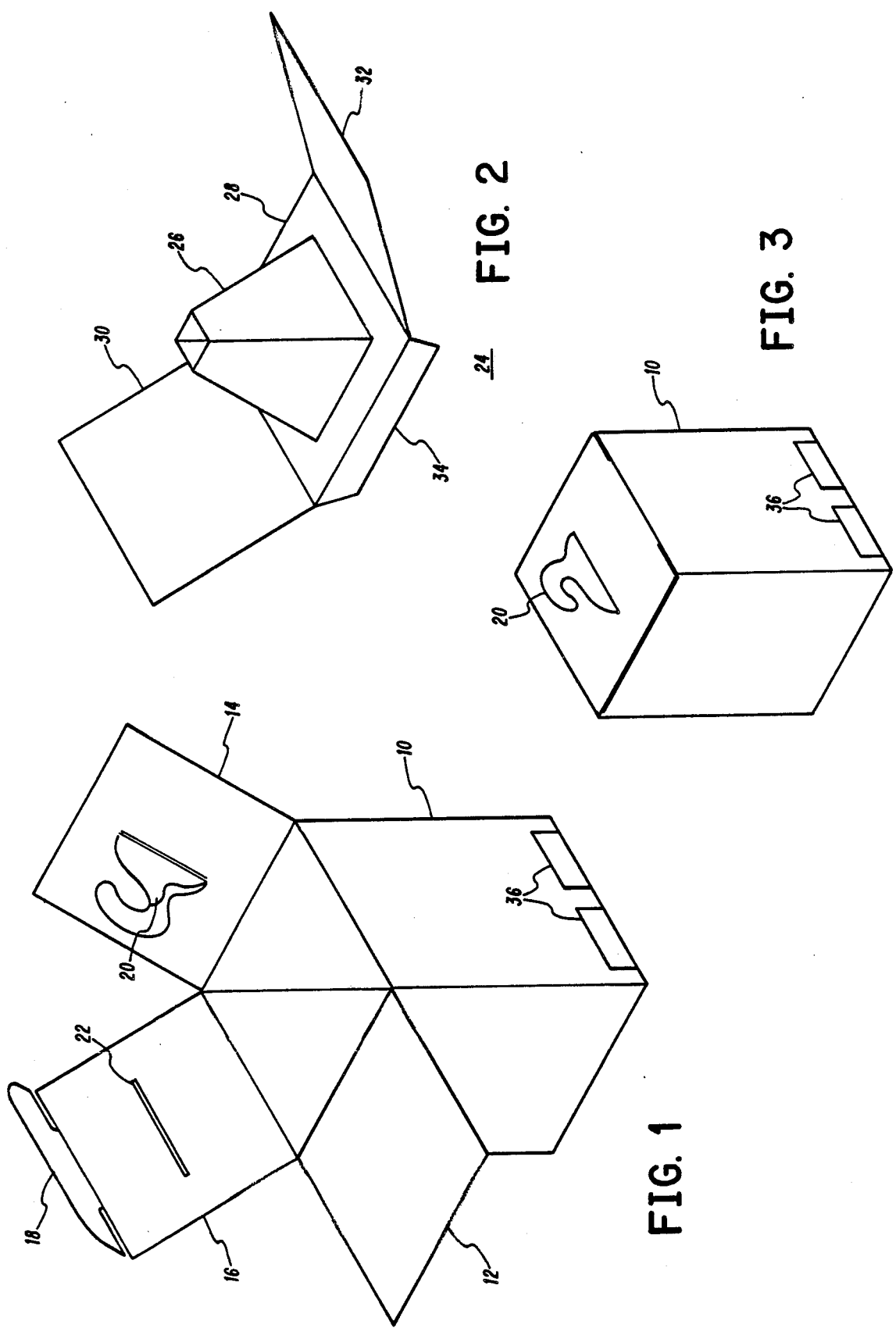
FIG. 1 is an isometric view of the unenclosed container of the fly trap.
FIG. 2 is an isometric view of the funnel as it is housed in the container of FIG. 1.
FIG. 3 is an isometric view of the closed container as it appears in normal operation with the funnel housed therein.

As shown in FIGS. 1 and 3, the fly trap herein comprises an extended container such as box 10, which can be formed from any suitable material such as cardboard. Flaps 12, 14 and 16, attached to the top of box 10, are flipped over in that sequence to enclose container 10, with the extended portion 18 of flap 16, fitting into the space between the opposite side of container 10 and flaps 12 and 14 to secure the enclosure. A cut-out 20 of flap 14, when folded up, fits through a slit 22 in flap 18 to provide a simple means for hanging the fly trap from any suitable support.

The fly trap herein capitalizes on the fact that flies are inclined to fly upward but have great difficulty in flying downward. A member 24 shown in FIG. 2 is designed to fit snugly in container 10 to provide a tapering aperture to guide flies upward into the enclosed container wherein they eventually expire because of an inability to find their way back down through the aperture. The aperture is provided by a funnel such as pyramidal frustum 26 whose larger opening is at its base and which rests on a surface 28 having an opening coextensive with the base of frustum 26. Surface 28 has two flaps 30 and 32 extending therefrom which fold up perpendicular to surface 28 when member 24 is inserted in container 10, as shown. Surface 28 also has a small flap 34 and another one connected to its opposite edge (not shown) which cause surface 28 to be elevated from the bottom of container 10 when member 24 is inserted therein. The height of flap 34 is such as to place surface 28 above portals 36 and like portals in the opposite side of container 10 in its lower extremity, when member 24 is inserted therein. As will be appreciated, only one portal 36 is actually required, although more are preferred. Member 24 is inserted in container 10 so that its two flaps 30 and 32, are juxtaposed with the sides of container 10 containing portals 36. Consequently, the snug fit of member 24 in container 10 affords an enclosed pathway from portals 36 to the base opening of frustum 26 to guide any misfortunate flies from outside the container 10 into its interior for expiration.

To entice the flies into container 10, any sweet scent can be provided for placement either below or, as depicted by film 36, above surface 28. Exterminated flies will eventually drop to the top of surface 28 out of sight. If desired, additional assurance of exterminating the trapped flies can be provided by lining the interior walls of container 10 with any suitable sticky material to immobilize the flies upon contact therewith. Since the cost of the fly trap herein is relatively inexpensive, particularly by comparison with high tech devices, such as those which attract and electrocute flies, it can be merely tossed away after extended usage and replaced with a new one.

As the foregoing demonstrates, the invention herein provides a new and improved fly trap which is inexpensive and moreover which is simple and pleasant to use. Since various modifications to the foregoing detailed description which would not depart from the scope and spirit of the invention are undoubtedly possible, the preferred embodiment described herein is intended to be merely exemplary and not restrictive of the invention as will now be claimed hereinbelow.

What is claimed is:

1. A fly trap comprising:
   an extended closed container having a portal in its lower extremity;
   a funnel located in said container which tapers from the lower extremity of the container to its upper extremity, there being a space between the top of said funnel and the upper extremity of said container,
   a surface on which said funnel rests to elevate it above the top of the portal in said container;
   a first pair of flaps connected to the opposite edges of said surface to provide the elevation for said funnel, and
   a second pair of flaps connected to the opposite edges of said surface which are not connected to said first pair of flaps for pressing against the side walls of said container when said funnel is inserted therein.

* * * * *